United States Patent
Smith

(10) Patent No.: US 11,960,716 B2
(45) Date of Patent: Apr. 16, 2024

(54) MODELESS INTERACTION MODEL FOR VIDEO INTERFACE

(71) Applicant: HULU, LLC, Santa Monica, CA (US)

(72) Inventor: Nathanael Smith, Los Angeles, CA (US)

(73) Assignee: HULU, LLC, Santa Monica, CA (US)

(*) Notice: Subject to any disclaimer, the term of this patent is extended or adjusted under 35 U.S.C. 154(b) by 0 days.

(21) Appl. No.: 17/383,211

(22) Filed: Jul. 22, 2021

(65) Prior Publication Data

US 2023/0027231 A1 Jan. 26, 2023

(51) Int. Cl.
| | |
|---|---|
| *G06F 3/04886* | (2022.01) |
| *G06F 3/04815* | (2022.01) |
| *G06F 3/0482* | (2013.01) |
| *G06F 3/0483* | (2013.01) |
| *H04N 21/431* | (2011.01) |

(52) U.S. Cl.
CPC ...... *G06F 3/04886* (2013.01); *G06F 3/04815* (2013.01); *G06F 3/0482* (2013.01); *G06F 3/0483* (2013.01); *H04N 21/4316* (2013.01)

(58) Field of Classification Search
CPC .......... H04N 21/4316; H04N 21/4307–43079; H04N 21/47217; H04N 21/4722–4725; H04N 21/4438; H04N 5/45; H04N 21/431–4318; G06F 2203/04803; G06F 3/04886; G06F 3/0483; G06F 3/04815; G06F 3/0482

See application file for complete search history.

(56) References Cited

U.S. PATENT DOCUMENTS

| | | | |
|---|---|---|---|
| 6,400,379 B1* | 6/2002 | Johnson ............... | H04N 21/431 715/721 |
| 2013/0174179 A1* | 7/2013 | Park ..................... | G06F 9/4843 718/107 |
| 2013/0283203 A1* | 10/2013 | Batraski ............... | G06F 16/438 715/783 |
| 2013/0305184 A1* | 11/2013 | Kim ..................... | G06F 9/451 715/810 |
| 2014/0184530 A1* | 7/2014 | Hyun ................... | G06F 1/1643 345/173 |
| 2014/0259072 A1* | 9/2014 | Chuang ............... | H04N 21/4314 725/44 |

(Continued)

OTHER PUBLICATIONS

Julie Alexander, The Verge, "Netflix will now let you disable its awful autoplaying feature" https://www.theverge.com/2020/2/6/21126867/netflix-autoplay-feature-disable-homepage-episodes-series;2 pages, Feb. 6, 2020.

(Continued)

*Primary Examiner* — David S Posigian
(74) *Attorney, Agent, or Firm* — Kwan & Olynick LLP

(57) ABSTRACT

In some embodiments, a method applies a priority to a plurality of surfaces where the plurality of surfaces each include content. Content is displayed from a first portion of a first surface in the interface based on a priority that is applied to the first surface. A second portion of a second surface is obscured by the first surface. The method maintains operation of the second portion of the second surface and receives an interaction from the interface. The display of the interface is adjusted by displaying the second portion of the second surface in the interface in a state based on the maintaining of the operation.

22 Claims, 13 Drawing Sheets

(56) References Cited

U.S. PATENT DOCUMENTS

| | | | | |
|---|---|---|---|---|
| 2015/0067601 A1* | 3/2015 | Bernstein | .............. | G06F 3/0412 |
| | | | | 715/823 |
| 2015/0128179 A1* | 5/2015 | Cormican | ............... | H04L 41/22 |
| | | | | 725/38 |
| 2015/0153948 A1* | 6/2015 | Bocking | ............... | G06F 3/0484 |
| | | | | 715/802 |
| 2022/0272188 A1* | 8/2022 | Chen | ................. | H04M 1/27475 |

OTHER PUBLICATIONS

NewsDesk, ExBulletin, "iOS 14 adds picture-in-picture mode to your iPhone"; https://exbulletin.com/tech/455785/; 5 pages, Oct. 20, 2020.

Ryan Christoffel,"Castro Debuts Extensive Siri and Shortcuts Podcast Controls"; https://www.macstories.net/ios/castro-debuts-extensive-siri-and-shortcuts-podcast-controls/.

Nadia Emma Hussain, "UX/UI Case Study: Moleskin's Timepage", https://medium.com/@nadiahussain96/ux-ui-case-study-a9975c79e642, Jan. 19, 2019, 8 pages.

"Domestic Abroad Economy"; https://www.tagesschau.de/; Jul. 22, 2021. 39 pages.

* cited by examiner

MODELESS INTERACTION MODEL FOR VIDEO INTERFACE

BACKGROUND

An interface of a video streaming system may allow a user account to stream an instance of content (e.g., a video), and also perform another action, such as browse a content library. Typically, to allow this, the interface may provide a picture-in-a-picture (PIP) to collapse a media player into a smaller window. The PIP window may float on top of other information displayed in the interface, which may obscure portions of the interface that are located behind the PIP window. Accordingly, if the user account wants to view or interact with any information that is obscured by the PIP window, the PIP window must be moved to a different location, moved off-screen, or closed. Another approach overlays an interactive user interface on top of a video that is playing in the background. However, the inverse drawback of the picture-in-a-picture occurs with this approach as the video is now obscured by the interactive user interface.

The interface may also operate in distinct modes. For example, when a transition from a browse interface that is displaying a preview video (which may be shown with details about the video) to playing the video in a full screen media player occurs, the interface may switch modes. In some cases, the interface that is displaying the preview video may be closed because the media player that plays preview videos is a streamlined version that is not able to play full length videos, and the mode is switched to a full-screen media player that can play full length videos. If the user account wants to go back to the browse interface, the full-screen media player must be closed and then the interface is transitioned back to the mode to display the browse interface. The transitions require opening and closing the media player or browse interface, which may not be a fluid transition.

BRIEF DESCRIPTION OF THE DRAWINGS

With respect to the discussion to follow and to the drawings, it is stressed that the particulars shown represent examples for purposes of illustrative discussion, and are presented to provide a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Figure 1:
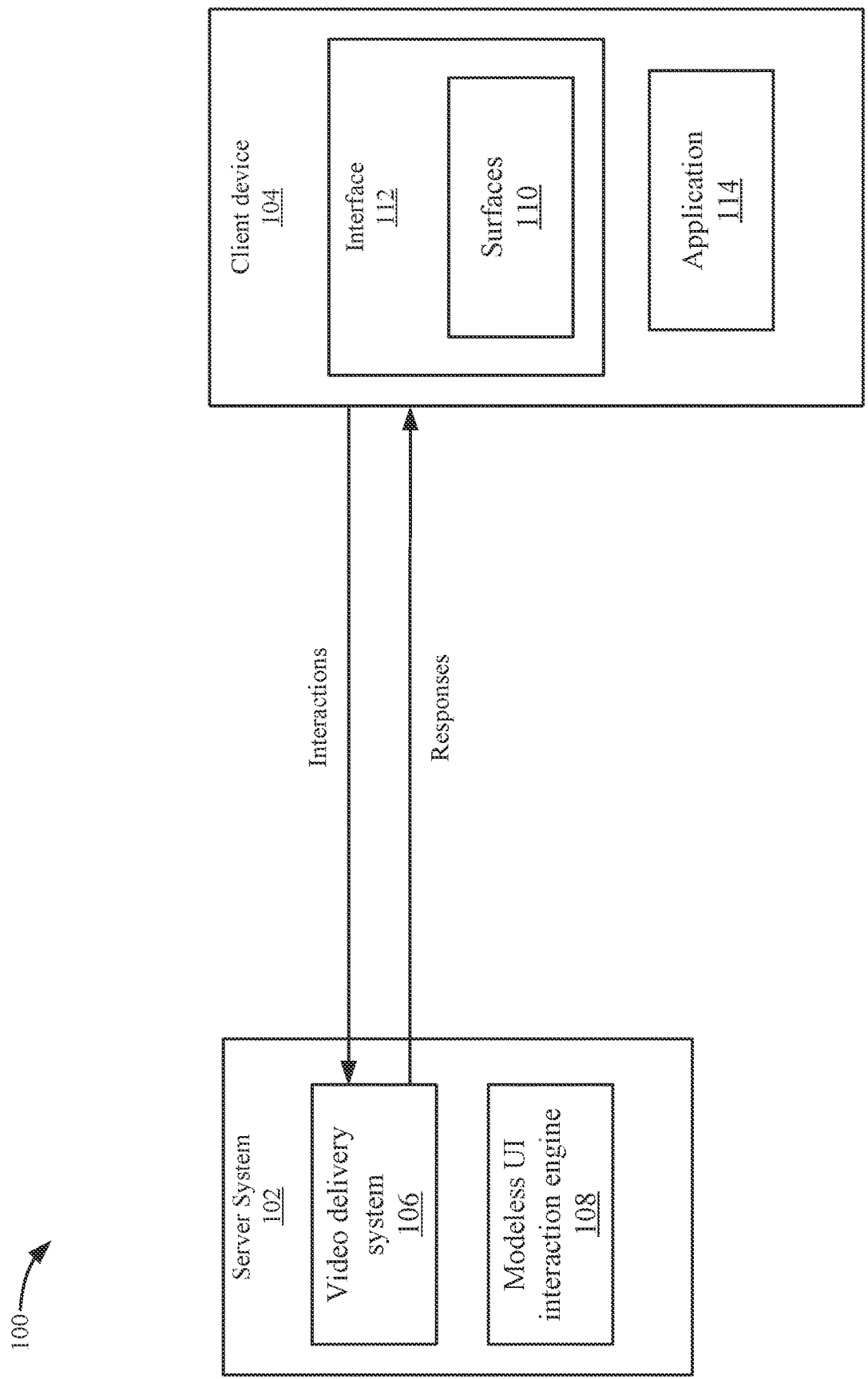
FIG. 1 depicts a simplified system for providing a modeless interface according to some embodiments.

Described herein are techniques for a video delivery system. In the following description, for purposes of explanation, numerous examples and specific details are set forth to provide a thorough understanding of some embodiments. Some embodiments as defined by the claims may include some or all the features in these examples alone or in combination with other features described below and may further include modifications and equivalents of the features and concepts described herein.

A system provides a modeless interface that includes multiple surfaces. The surfaces may be assigned positions, such as positions on different planes in a space (e.g., a three-dimensional space). The system may display the surfaces based on a priority of the positions. For example, the planes may be organized in a hierarchy where a first plane may be positioned on a primary plane, a second plane may be positioned on a secondary plane, a third plane may be positioned on a tertiary plane, etc. The primary plane may be displayed in the foreground; a secondary plane may be displayed in the background behind the primary plane, the tertiary plane displayed behind the secondary plane, etc. The interface displays surfaces based on the positioning of the planes. For example, if an opaque portion of a surface #1 on a primary plane is blocking (e.g., on top of) another portion of a surface #2 on a secondary plane, the portion on the surface #1 is displayed and the portion on the surface #2 is obscured. However, if the surface #1 is not obscuring a portion of the surface #2, the portion on the surface #2 can be seen on the interface.

Interactions from an input device may be received on any surfaces that are displayed in the interface regardless of the positioning of the surfaces on the planes. For example, interactions on a surface #1 on the primary plane or a surface #2 on the secondary plane may be received. Further, the system may receive interactions to toggle the positioning of the surfaces. For example, surface #2 on a secondary plane may be brought to the primary plane, which will display the surface #2 as the primary plane on the interface.

The interface is modeless in that the surfaces may remain operating in the state that they are in regardless of plane positioning. For example, if a surface #1 is a media player playing a video, the media player may not be closed and/or the video may continue to play (or be paused) as the surface is toggled between plane positions. In this way, a video playing on a surface may remain playing on the surface when it is changed from a secondary plane to a primary plane, or vice versa. Further, the media player on surface #1 may be brought back to the primary plane and may obscure a browse interface on surface #2 when transitioning to a full screen media player. However, the state of surface #2 may not change as modes are not changed, and the system can return to the browse interface by toggling surface positioning.

The modeless interface improves a user interface in many ways. For example, the modeless operation may not require surfaces to be closed even when obscured by another surface. Also, the surfaces may be arranged such that interactive areas may be unobscured by other surfaces to allow user accounts to browse content libraries and watch content simultaneously. Accordingly, the system does not have to exit one mode to interact with another mode, such as by exiting a media player to interact or browse the content library. Accordingly, the system may toggle the plane positioning to display different surfaces without exiting modes, which removes the requirement to close and restart features of the interface. The toggling provides a fluid transition as objects on the interface may not be opened and closed when toggling surface positioning. This is different from changing modes to close one mode and open another mode. Also, a media player may be played in a separate surface rather than embedding the media player in a surface that includes the content that can be browsed. This separates the two different interaction surfaces, which may improve the operation of the interface because the browsing of the content library does not affect the positioning of the media player playing the video. For example, if the media player is playing videos in line with the content library, the media player may be moved to an undesirable position when browsing the content library. Also, the surfaces may be positioned such that desired information is not obscured on a surface based on the positioning of planes, and surfaces may be moved to display previously obscured content on another surface without having to change modes.

System Overview

FIG. 1 depicts a simplified system 100 for providing a modeless interface 112 according to some embodiments. System 100 includes a server system 102 and client device 104. System 100 includes a server system 102 and a client device 104. Although a single instance of server system 102 and client device 104 is shown, multiples instances will be appreciated. For instance, server system 102 may include multiple servers or other computing devices to provide the functionality described herein. Also, system 100 may include multiple client devices 104 that interact with server system 102.

Server system 102 may include a video delivery system 106 that delivers videos to client devices 104. In some embodiments, video delivery system 106 may use a content delivery network (CDN) (not shown) to deliver the videos. The videos may be content that is requested by a user account associated with client device 104. For example, a user account may request a movie, an episode of a show, etc. Although videos are described, it will be understood that other content may also be delivered, such as a website, page of content, etc.

Client device 104 may be a computing device, such as a smartphone, living room device, personal computer, tablet, television, set-top box, etc. Client device 104 may include an interface 112 that may display content, such as videos or interactive browse surfaces for content libraries of videos. For example, a media player may play back a video that is requested from video delivery system 106 or a library of videos may be presented for browsing. A user account may use client device 104 and may be associated with video delivery system 106 (e.g., the user account signs up for the service). A user that is associated with the user account may use client device 104.

Although multiple client devices 104 are not shown, video delivery system 106 may receive multiple requests from multiple client devices 104. Client devices 104 may send requests for content to video delivery system 106. For example, the requests may be for playback of different content, such as different videos.

Interface 112 may display content from surfaces 110. Surfaces 110 may display any type of content on interface 112. In some embodiments, surfaces 110 may be provided in different categories that organize the content of a surface. For example, categories may include a player surface, browse surfaces, detail surfaces, and/or control surfaces 110. A player surface 110 may be where the media player is displayed that can play content, such as video. The player surface 110 may play a video in a preview mode (e.g., only a portion of the video) or play the full video. The player surface 110 may also include controls to control the video or the controls may be on a separate surface. A browse surface 110 may be where content can be browsed, such as to select content for playback on the player surface. The browse surface 110 may display content in different formats, such as in a grid or list. The details surface 110 may be where information for a specific instance of content is shown in greater detail. If the control surface is on a separate surface 110, the control surface 110 may be controls for other surfaces 110, such as controls for the player surface 110 or the browse surface 110. Although these types of surfaces 110 are described, other types of surfaces can be used.

An application 114 may control surfaces 110. For example, application 114 may include logic to receive interactions from surfaces 110 on interface 112. The interactions may be received via input devices, which may be touchscreens, remote controls, keyboards, a mouse, etc. As will be discussed in more detail below, application 114 may be processing interactions for respective surfaces 110, such as receiving playback requests for content, or browse requests for browsing a content library. Additionally, application 114 may process interactions to control the positioning of planes in interface 112. For example, interactions may move the positioning of the planes in a space.

A modeless user interface (UI) interaction engine 108 may provide an interaction model to application 114. The interaction model may configure the content of surfaces 110, such as designating which content to display on surfaces 110 and in what layout. Additionally, the interaction model may control how to process interactions on surfaces 110. The functions that are described herein may be performed by application 114 and/or modeless UI interaction engine 108. For example, client device 104 may send interactions to server system 102, which are processed by modeless UI interaction engine 108. Then, modeless UI interaction engine 108 sends responses to client device 104. In other embodiments, application 114 may process the interactions without contacting server system 102. For example, manipulation of the planes in interface 112 may be performed by application 114 without contacting modeless UI interaction engine 108. However, when a video playback request is received, application 114 may send a request to server system 102. Or, when new content is displayed in a content library on a browse surface 110, modeless UI interaction engine 108 may send the content to display to application 114. In any cases, functions described from either modeless UI interaction engine 108 or application 114 may be performed by either of them.

Interface Example

Figure 2:
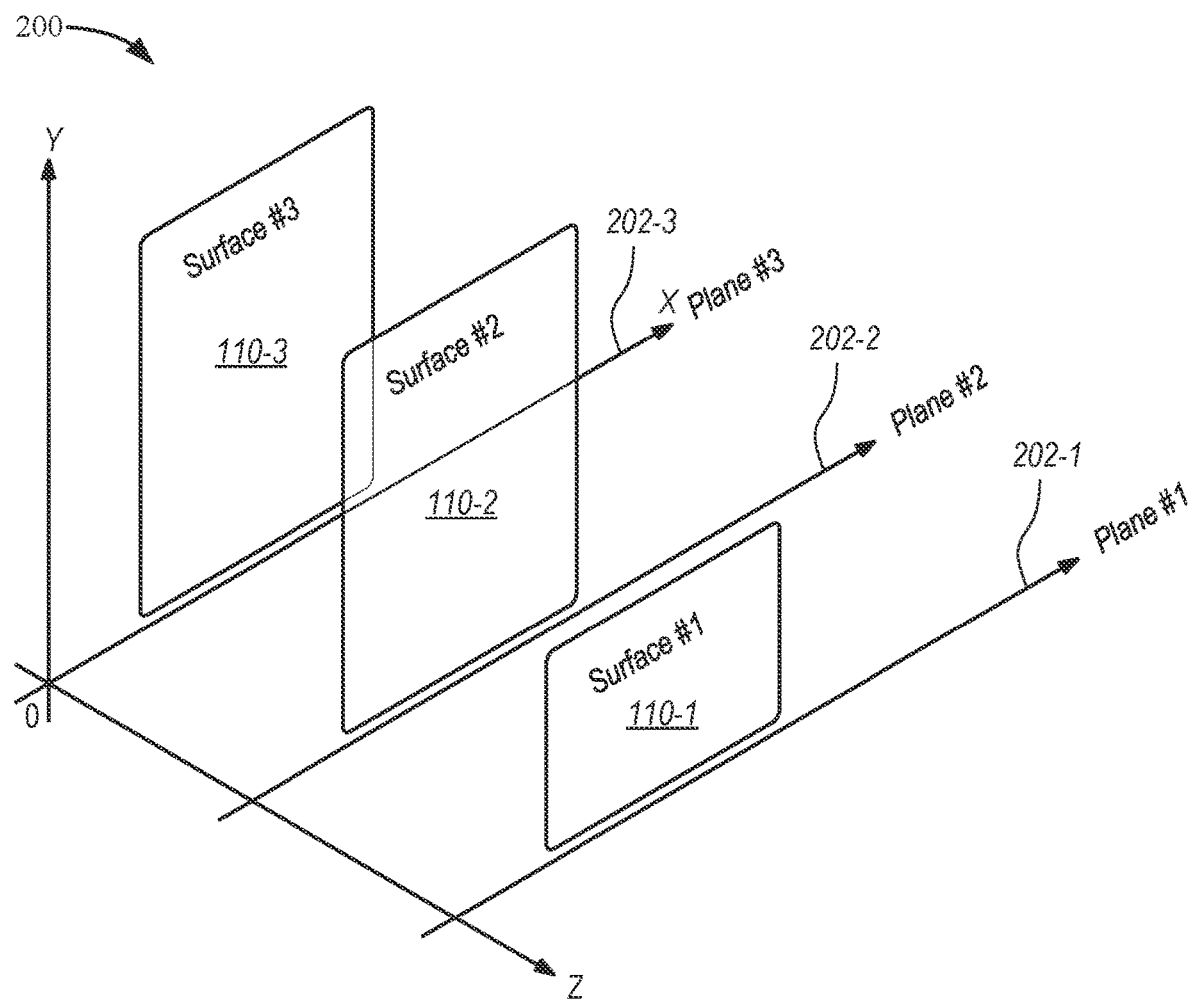
FIG. 2 depicts an example of a space in which planes are positioned according to some embodiments.

FIG. 2 depicts an example of a space 200 in which planes 202 are positioned according to some embodiments. Space 200 may be shown for conceptual understanding of the positioning assigned to surfaces 110 and the space may be implemented in different ways. The concept of assigning surfaces 110 to planes 202 allows application 114 to determine which portions of surfaces 110 to show in interface 112 and also to determine which interactions to apply to which surfaces 110.

In some embodiments, space 200 is a three-dimensional space with X, Y, and Z coordinates. Space 220 includes planes 202-1 to 202-3 that are oriented with respect to a reference, such as a screen of interface 112. For example, planes 202 that are further out on the Z axis (greater than zero) may be positioned in front of planes that are closer to the zero point of the Z axis on interface 112. For example, a plane #1 202-1 is in front of a plane #2 202-2, which is in front a plane #3 202-3. Priorities may be assigned to the plane according to the positioning in the space with respect to the screen of interface 112. For example, plane #1 may be considered a primary plane; plane #2 may be considered a secondary plane; and plane #3 may be considered a tertiary plane where the priority is the primary plane, secondary plane, tertiary plane, etc. The priority may define how surfaces 110 are displayed. For example, a surface #1 110-1 may be on plane #1 and may obscure any portion of surfaces 110 that are behind it. Further, surface #2 110-2 may obscure any portion of surfaces behind it, such as surface #3 110-3.

Figure 3:
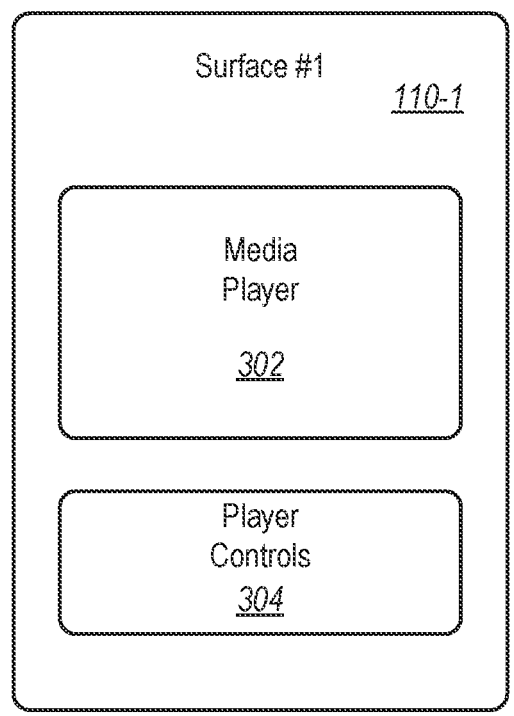
FIG. 3 depicts an example of surfaces according to some embodiments.
Figure 3:
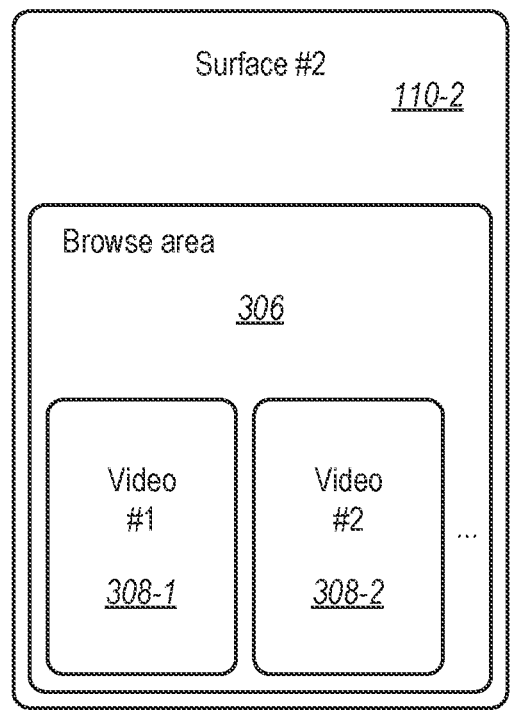

Surfaces 110 may include different objects. FIG. 3 depicts an example of surfaces 110 according to some embodiments. Surface #1 110-1 may be a player surface that includes different objects, such as a media player 302 and player controls 304. Media player 302 may play a video that is selected from another surface. Player controls 304 may control media player 302. Media player 302 and player controls 304 are positioned in surface #1 110-1 in different areas.

Surface #2 110-2 may be a browse surface that allows browsing of different objects. For example, a browse area 306 allows browsing of a content library, which is shown as video #1 308-1, video #2 308-2, etc.

Interaction Processing

Figure 4A:
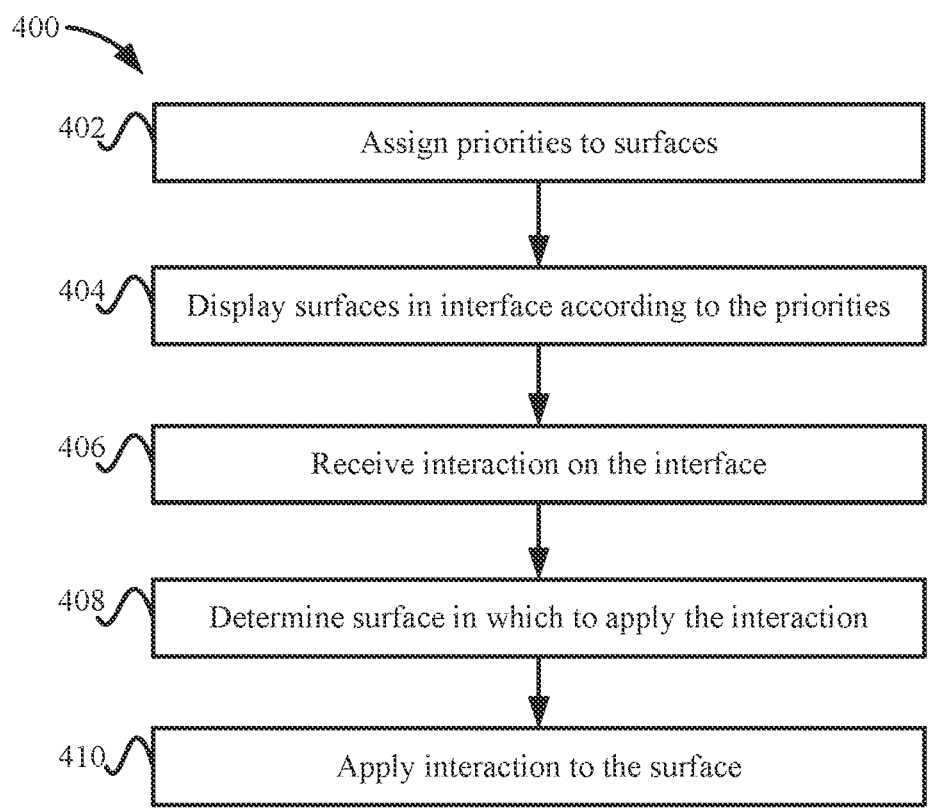
FIG. 4A depicts a simplified flowchart for positioning surfaces and processing interactions according to some embodiments.

Many different configurations of surfaces 110 and interactions may be appreciated. FIG. 4A depicts a simplified flowchart 400 for positioning surfaces 110 and processing interactions according to some embodiments. At 402, application 114 assigns a priority to surfaces 110. For example, application 114 assigns surfaces 110 to planes 202. The initial assignment may be based on a configuration, such as a media player surface may initially be assigned to plane #1, a browse surface to plane #2, etc. The assignment may also depend on which portion of the interface is currently being viewed on screen.

At 404, application 114 displays surfaces 110 in interface 112 according to the priorities. As discussed above, application 114 may display surfaces 110 based on the plane priority.

At 406, application 114 receives an interaction on interface 112. The interaction may be a selection from an input device on a surface 110 of interface 112. The selection may be received via different input methods, such as by touch screen, remote control, etc.

At 408, application 114 determines a surface in which to apply the interaction. For example, application 114 determines position of the interaction on interface 112 and translates that position to a visible area of one of surfaces 110.

At 410, application 114 applies the interaction to surface 110. The interaction may perform different actions, such as a video may be played, a position of a surface 110 or multiple surfaces 110 may be shifted, the priority of surfaces 110 may be changed, etc. Different interactions will be described, but other interactions may be appreciated.

Figure 4B:
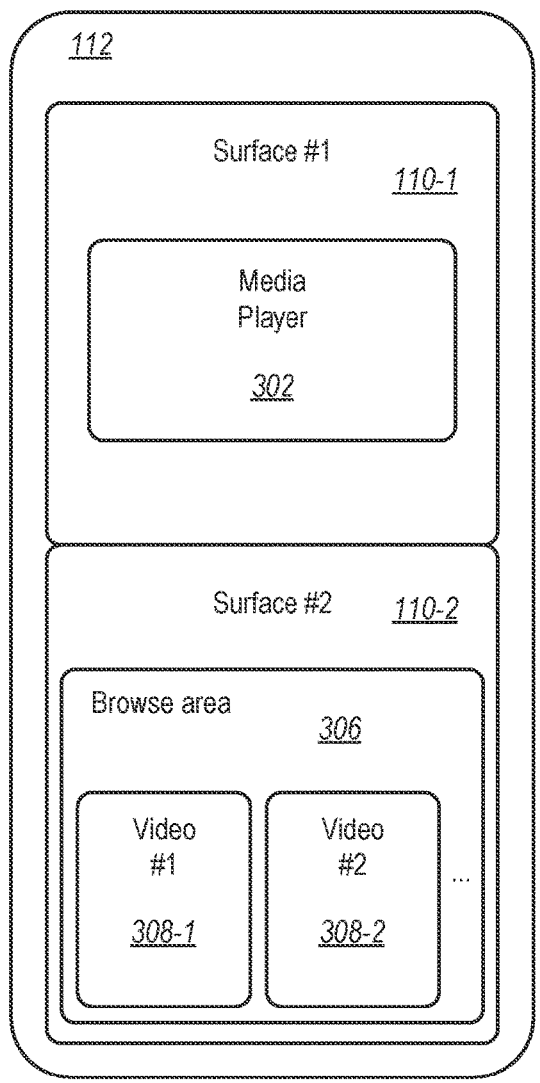
FIG. 4B depicts an example of a surface #1 and a surface #2 being displayed in the interface according to some embodiments.
Figure 4C:
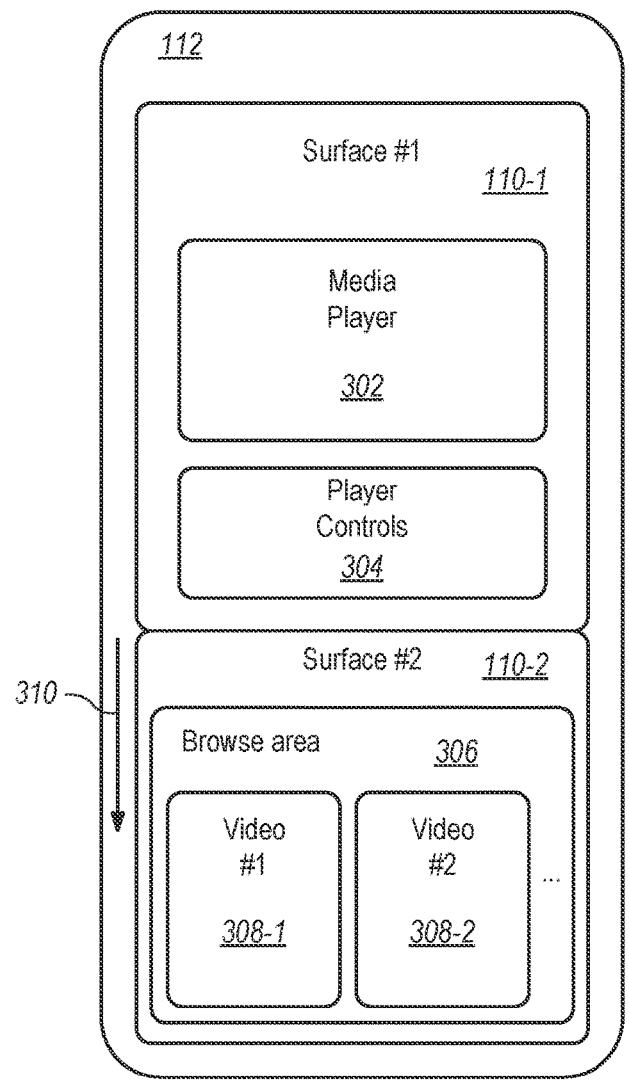
FIG. 4C depicts an example of moving surface #2 according to some embodiments.
Figure 4D:
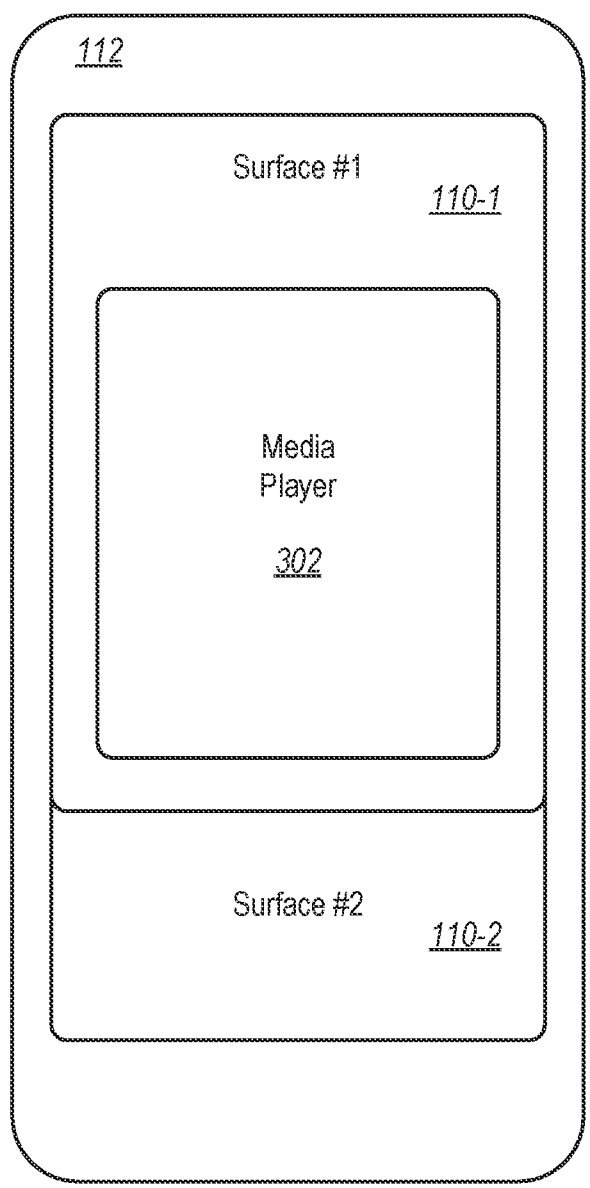
FIG. 4D depicts an example of moving surface #1 to the primary plane according to some embodiments.

FIGS. 4B to 4D depict examples of interface 112 in response to processing of interactions. FIG. 4B depicts an example of surface #1 110-1 and surface #2 110-2 being displayed in interface 112 according to some embodiments. Surface #2 110-2 may be positioned on plane #1 202-1 and surface #1 110-1 may be positioned on plane #2 202-2. In this case, surface #2 110-2 may obscure portions of surface #1 110-1 because surface #2 110-2 has a higher priority than surface #1 110-1. For example, player controls 304 are in a position in surface #1 110-1 that is obscured by surface #2 110-2, such as by browse area 306. Surface #2 110-2 may be opaque and information behind surface #2 110-2 is not displayed. In other embodiments, if portions of surface #2 110-2 are translucent, then anything behind the translucent portions of browse area 306 may be viewed (and possibly interacted with).

Surfaces 110 may be moved to reveal portions of another surface. FIG. 4C depicts an example of moving surface #2 110-2 according to some embodiments. At 310, application 114 receives an interaction to move surface #2 110-2 down the Y axis. By moving surface #2 110-2 down, player controls 304 are revealed on surface #1 110-1. Also, surface #2 110-2 may be moved such that a transparent portion of surface #2 110-2 reveals player controls 304. Although not shown, it is possible that portions of surface #2 110-2 and/or browse area 306 may be off-screen of interface 112 if surface #2 110-2 is moved down the Y axis. Player controls 302 on surface #1 110-1 were still instantiated on surface #1 110-1 even though player controls 302 were obscured. Accordingly, application 114 can display player controls 302 without opening or instantiating player controls 302. Further examples of moving surfaces 110 will be described below.

The positioning of surfaces 110 on planes 202 may also be changed. FIG. 4D depicts an example of moving surface #1 110-1 to the primary plane according to some embodiments. In this example, surface #1 110-1 is moved from plane #2 202-1 to plane #1 202-1. Surface #2 110-2 is moved from plane #1 202-1 to another plane, such as plane #2 202-1. Because plane #1 202-1 is higher in priority than plane #2 202-2, surface #1 110-1 may now obscure portions of surface #2 110-2.

In some embodiments, media player 302 may be expanded in surface #1 110-1 to be larger, which may obscure more area of surface #2 110-2. Media player 302 may be able to play previews and full length videos. Because media player 302 operates independently from browse surface #2 110-2, restrictions on the logic of media player 302 being displayed on a browse surface are removed. Accordingly, media player 302 can be configured differently than when integrated with the browse surface.

As shown, only a small portion of surface #2 110-2 is shown in interface 112. Any information of surface #2 110-2 that is behind surface #1 may be obscured if surface #1

110-1 is opaque. If portions of surface #1 110-1 are translucent, such as areas that are outside of media player 302, then those portions may display information from surface #2 110-2. Application 114 may maintain the state of surface #2 110-2 and portions of surface #2 110-2 may be later displayed without having to open or instantiate objects.

As discussed briefly above, surfaces 110 may be operated independently. If multiple surfaces are visible at the same time—for example, a media player surface, a player controls surface, and a browse area surface, then application 114 may be running independent processes on each surface 110. For example, the media player could be streaming and rendering video (with or without audio). The player controls can reflect the state of the media player, for example, whether closed captions are visible, whether the video is playing or paused, etc. The browse area may be fetching content recommendations and displaying various collections of video items. With this method of simultaneous, independent operations, interface 112, such as a touch screen, for example, can complete independent tasks on different areas of the display. Also, a directional remote, for example, can be used to receive input to navigate across surfaces 110 to quickly complete tasks, rather than dismissing surfaces 110 in order to navigate to other surfaces 110.

Figure 5A:
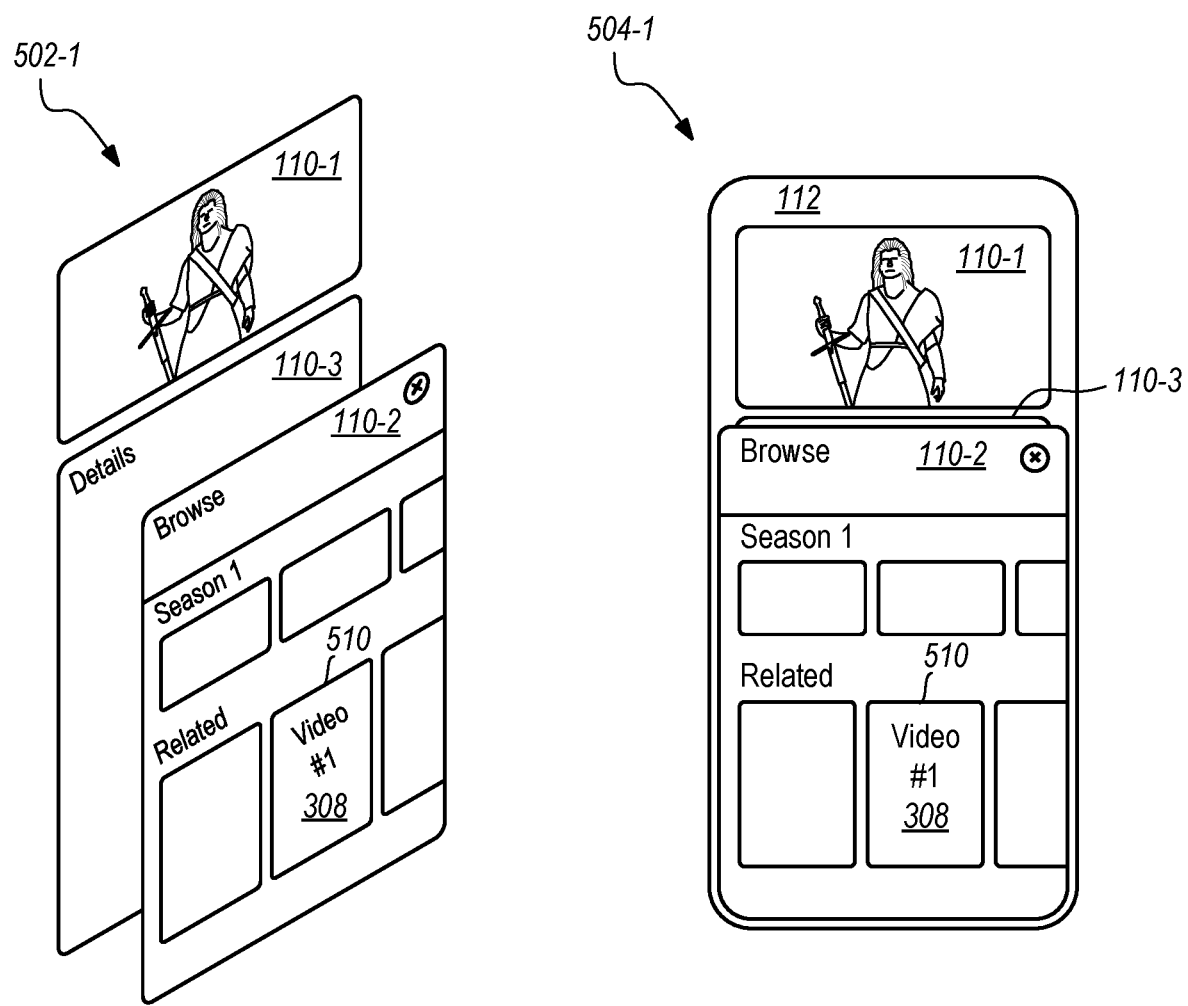
FIG. 5A depicts an example of changing the positioning of surfaces on planes according to some embodiments.
Figure 5B:
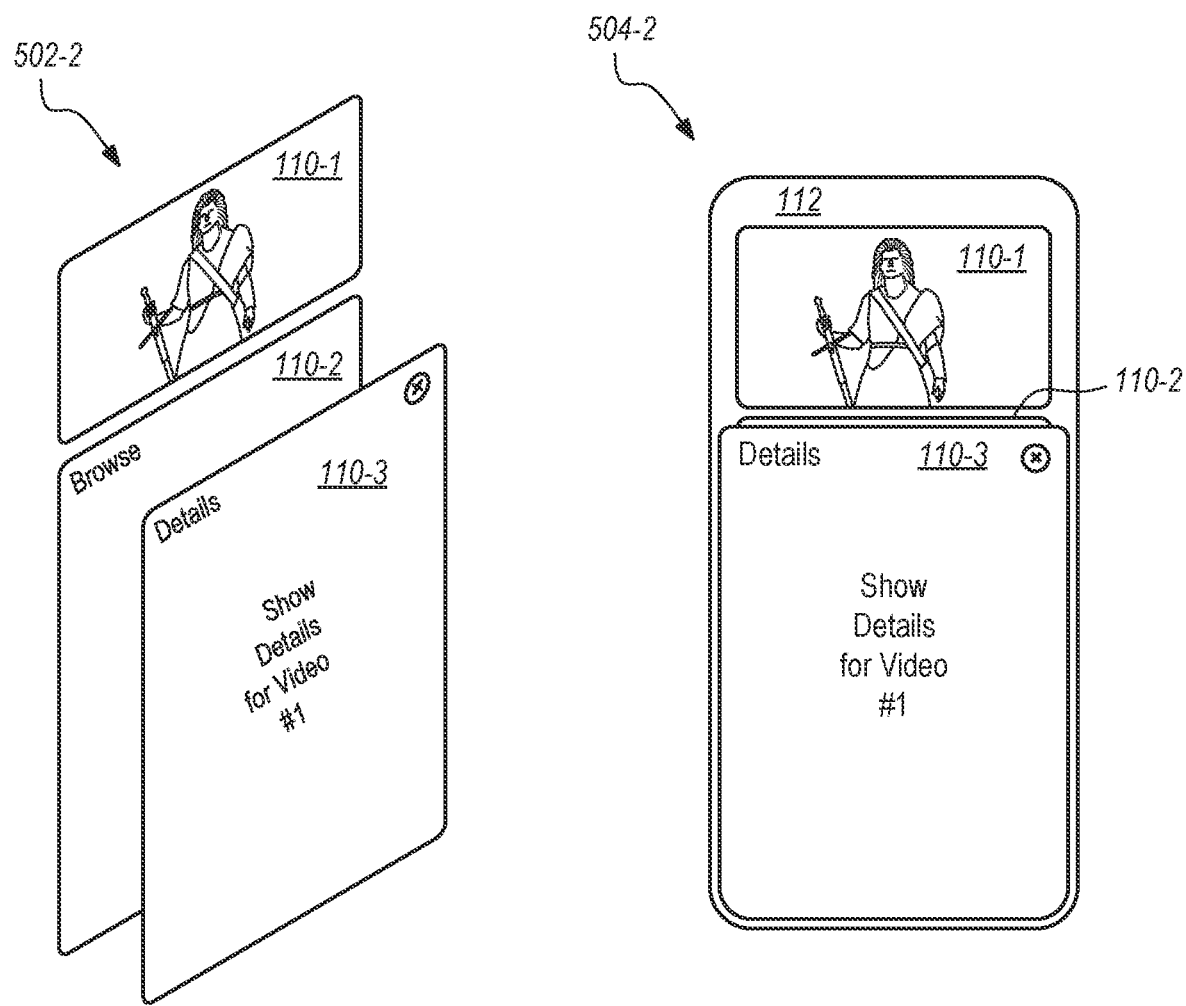
FIG. 5B depicts a second example of the interface after receiving the interaction according to some embodiments.

In some embodiments, the use of planes 202 and surfaces 110 may allow interaction to change the visibility of certain areas of surfaces FIG. 5A depicts an example of changing the positioning of surfaces 110 on planes 202 according to some embodiments. A first perspective 502-1 shows the positioning of surfaces 110-1 to 110-3 in planes 202. Surface 110-2 may be a browse surface to allow browsing of videos. Surface 110-3 may be a details surface that shows more details of videos. Surface 110-1 may be a media player surface that plays a video. A second perspective 504-1 shows the display of surfaces 110 in interface 112. Application 114 may receive an interaction to display more details of a video. For example, a selection of a tile showing a video #1 308 at 510 may be received to reveal details from another surface #3 110-3. FIG. 5B depicts a second example of interface 112 after receiving the interaction according to some embodiments. In this case, surface #3 110-3 is switched from plane #2 202-2 to plane #1 202-1 to display details of video #1 308. In a second version of second perspective 504-2, details for the video are shown and the tile for video #1 308 is obscured by the details. Also, as shown in a second version of first perspective 502-2, application 114 moves surface #2 110-2 from plane #1 202-1 to plane #2 202-2.

Figure 5C:
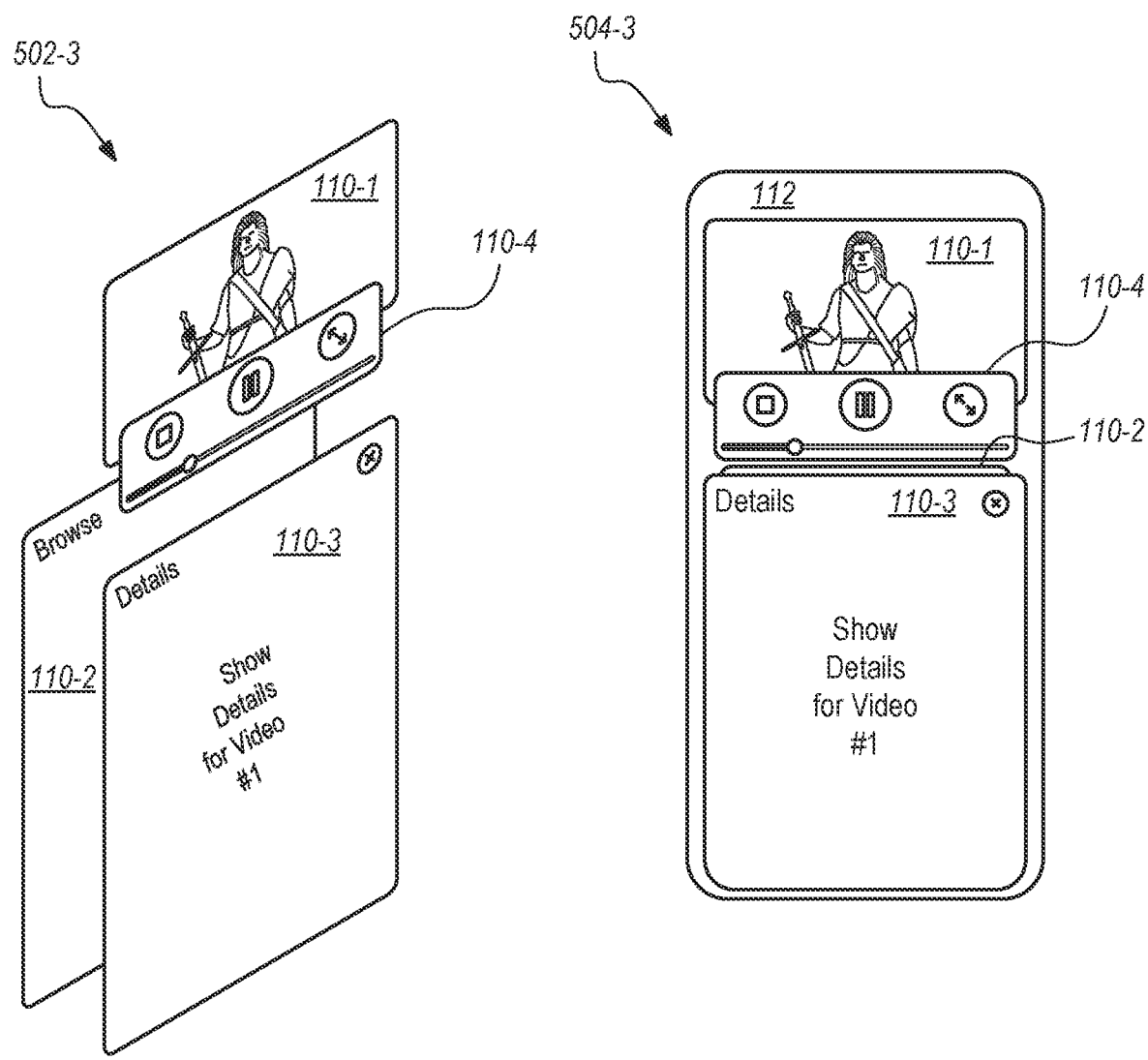
FIG. 5C shows another example of an interaction to reveal additional portions of a surface according to some embodiments.

FIG. 5C shows another example of an interaction to reveal additional portions of a surface 110 according to some embodiments. A third version of first perspective 502-3 shows three surfaces 110-1 to 110-3 from FIG. 5B in addition to a surface 110-4 that includes player controls.

Application 114 receives an interaction to move surface 110-3 down, which reveals the details of surface #4 110-4. In this case, surface #3 110-3 is translated down in the Y direction. This reveals more information (e.g., player controls) from surface #4 110-4 as shown in a third version of second perspective 504-3. Surface 110-4 may be located on a plane 202 that is in front of surface 110-1 and surface 110-2, and surface 110-4 is shown in interface 112.

When surfaces 110 are moved, the state of surfaces 110 may be preserved. That is, surfaces 110 may operate independently and are not closed. For example, if a video is playing on a surface #1 110-1, media player 302 may not be closed and that video may continue to play even if portions of media player 302 are obscured by another surface, such as surface #2 110-2. This allows the toggling between surfaces 110 without having to open and close media player 302 or other features. Also, application 114 may continue the operation of browse area 306. For example, when browse area 306 is revealed again, the state of browse area has been maintained. The use of a modeless interface 112 may operate more fluidly and faster in that the opening and closing of objects does not need to be performed when application 114 displays different portions of surfaces 110. This avoids the delay that is incurred to close objects and then re-open the objects. Also, interface 114 works in a seamless manner to display the different portions because any delay to exit or open modes is not required.

In some embodiments, portions of interface 112 may be dedicated to the visibility of surfaces 110 in planes that are behind a surface on the primary plane. This may allow media player 302 to be displayed while a browse area 306 can be displayed. When interacting with a detail surface 110 or browse surface 110, previews can be played in media player 302 without having to change the media player surface 110. That is, when an interaction for media player 302 is received, media player 302 is already instantiated on surface 110 and does not need to be opened. For example, if an interaction transitions to full playback from the preview, media player 302 is already playing on a surface 110 and the mode does not need to be changed from the preview mode to a playback mode. Rather, media player 302 can start playing the video.

In contrast to implementations where video previews are displayed while browsing, the use of surfaces 110 is distinct in that the surface including a full media player and a surface including player controls are available all the time even when not in use or displayed fully in interface 112. This provides a sense of interactive consistency (for example, a preview can be paused using the same controls on a surface 110 that are used to pause a full length video). If a transition from watching a preview to watching a full video is performed, the media player can change inputs instead of having to switch from a media player that is inline to play a preview to a media player configured to play the full length video. This simplifies an otherwise complex interaction across common user interfaces.

Plane Shift Processing

Figure 6:
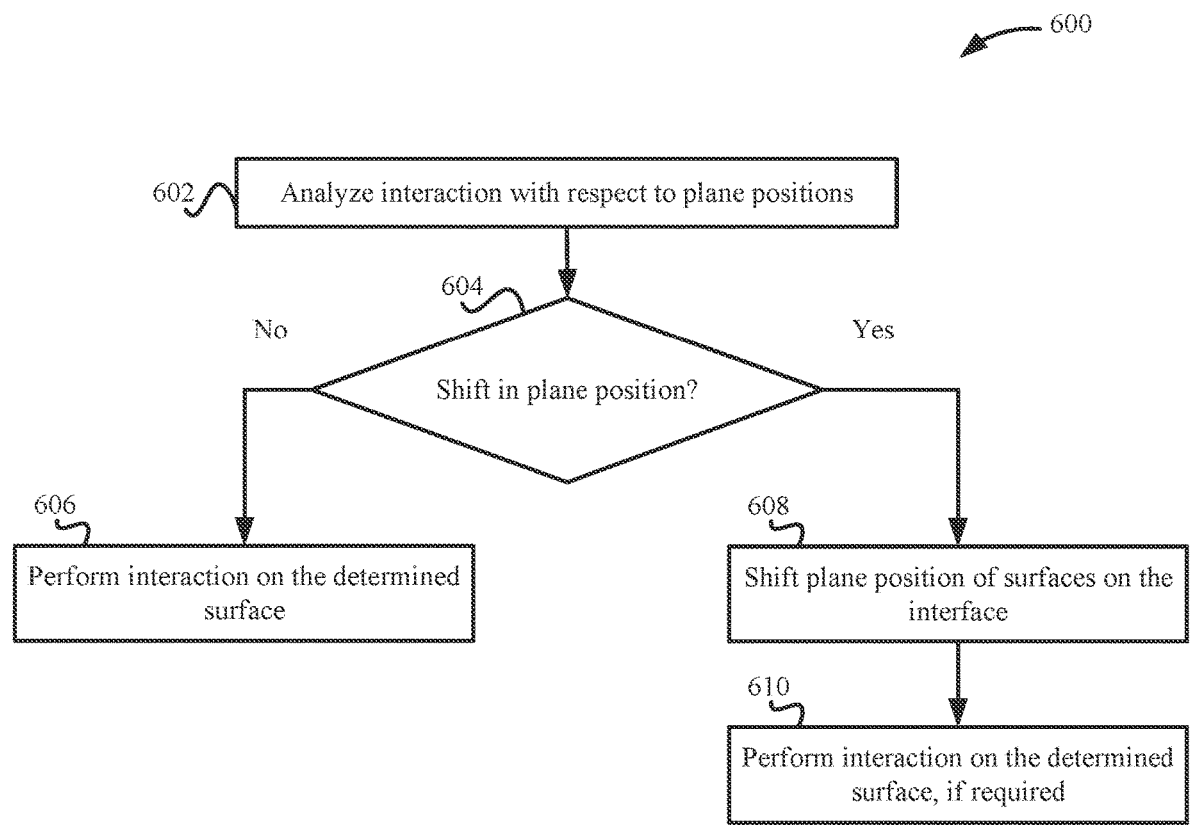
FIG. 6 depicts a simplified flowchart of a method for analyzing interactions to determine shifts in plane position according to some embodiments.

As discussed above, not only can actions be processed on surfaces 110, surfaces 110 may be shifted between planes 202 to reconfigure the display of interface 112. FIG. 6 depicts a simplified flowchart 600 of a method for analyzing interactions to determine shifts in plane position according to some embodiments. When plane position is discussed, it is noted that the plane position may be shifted in different ways. Conceptually, surfaces may be shifted to different planes 202 in a three dimensional space. Also, application 114 may shift the plane position by assigning a different priorities to surfaces 110. The use of planes 202 may be conceptual in that interface 112 may not be designed with the planes in a three dimensional space. For example, interface 112 may be a two-dimensional interface and application 114 determines which content to display from which surfaces 110 in the two dimensional interface. Application 114 may translate from the three dimensional space to the two dimensional interface. Plane positions will be used for discussion purposes.

At 602, application 114 analyzes an interaction with respect to plane positions. At 604, application 114 determines if there is a shift in plane position for surfaces 110. For example, a shift in plane position may be performed based on an explicit interaction on interface 112. In some examples, receiving a selection of a button on interface 112 may cause the shift in plane position or a receiving a movement, such as a swipe movement, may cause the shift in plane position. The shift in plane position may also be implicit. For example, an interaction may move a surface 110 to a different position on interface 112 that may cause the shift in plane position. Application 114 may assign different plane priorities to surfaces 110 when the plane positions are shifted.

The mechanism that controls the shift in plane position may depend on the input device that is used. In the case of a touch screen, several data points may be used determine the intention of the input. On the surface on the secondary plane, the input may drag vertically—that is, the input may be a touch and run of a finger across a display with relatively linear motion. The drag position can be used to render real-time feedback and can be compared to a series of thresholds. For example, to reveal player controls the input may drag vertically downward 80 pixels or more (a "short drag"). The drag position could render real-time feedback, for example, gradually adjusting the position and opacity of the player controls with each movement. But if the input stops before crossing the 80-pixel threshold, the shift will be cancelled, and the view will revert to the previous plane positions. In the same drag gesture, if the input continues dragging downward, the input may cross a second threshold: for example, to shift the browse surface largely outside of the viewport (to "enter full screen"), the input may drag downward 140 pixels or more (a "long drag"). In this case, player controls would be shifted into view if the inputs drags 80-140 pixels, while the player controls and media player would be shifted to the primary plane if the input drags 140 pixels or more. Other information may be used in combination with the thresholds to determine the desired input.

A "flick" gesture could alternatively be used to accomplish the same action. That is, an input that swipes across a display that has a relatively high velocity upon lifting of a finger off the display. In this case, the velocity is measured. Along the same lines as the "drag" gesture, there are thresholds for a "short flick" and a "long flick." If the input performs a short flick, the player controls surface would be shifted into view, while if the input performs a long flick, the browse surface would be shifted mostly out of view. To summarize, on a touch screen, the specific shift in planes that occur is determined using different inputs, such as both the "drag" and the "flick" gesture together.

The same general directional logic can be applied to another input mode, for example, a directional remote. With a directional remote, the input can only navigate up, down, left, or right. Thus, when moving directionally onto a surface which is on a secondary plane, the input would "hint" that the surface can be brought fully onto the primary plane with an explicit control button.

If a shift in plane position does not occur, at 606, application 114 performs the interaction on the determined surface 110. If a shift in plane position occurs, at 608, application 114 shifts the plane position of surfaces 110 on interface 112. This may display different areas of surfaces 110 based on the shift. The translation of surfaces 110 on planes 202 may be displayed on interface 112 using different methods. For example, application 114 may translate surfaces 110 across the Z axis. Also, application 114 may use scale shifts to perform the translations in interface 112. That is, application 114 may shift the scale of surfaces 110 based on the translation of surfaces 110 to other planes 202. For example, application 114 may increase the scale of a surface 110 that is moved to a primary plane 202, which may increase a size of the content on surface 110. Accordingly, a scale shift may make a surface 110 on the primary plane in the foreground appear larger and a surface 110 in the background appear smaller.

At 610, application 114 may perform the interaction on a determined surface, if required. For example, the received interaction may be more than just shifting the plane position of surfaces 110. In some examples, a selection of an item on a surface 110 may cause surfaces to shift planes 202 and also cause some action to be performed on a surface 110.

When surfaces 110 are moved into different planes 202, the state of the operation of surfaces 110 may be retained. Similar to described above where surfaces 110 are moved, surfaces 110 may continue to operate when changed to another plane 202 whether or not they are obscured or not. This allows the toggling between surfaces 110 without having to open and close objects or change modes.

Interactions Across Surfaces

Figure 7:
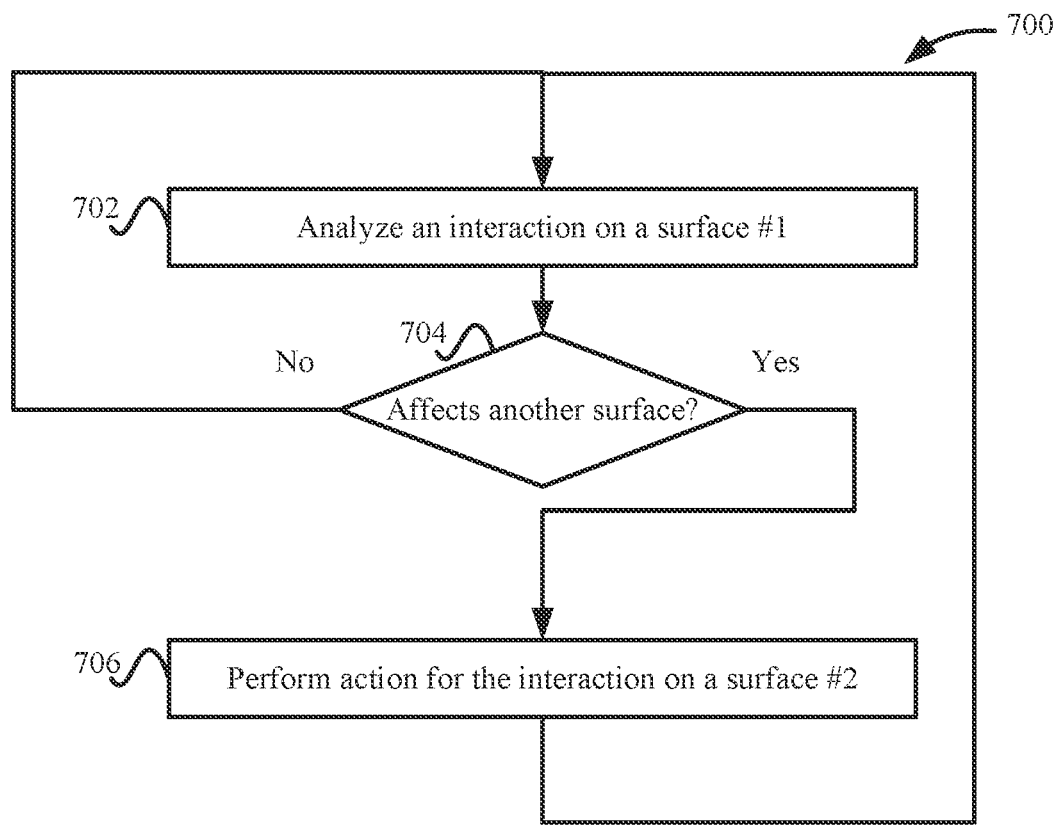
FIG. 7 depicts an example of a simplified flowchart for processing interactions across surfaces according to some embodiments.

Interactions received on one surface 110 may also be translated to an action on another surface 110. FIG. 7 depicts an example of a simplified flowchart 700 for processing interactions across surfaces 110 according to some embodiments. At 702, application 114 analyzes an interaction on a surface #1 110-1. At 704, application 114 determines if the interaction affects another surface 110. For example, as with the change in positioning of the planes 202, the determination of whether an interaction affects another surface may be explicit or implicit. An explicit input may be received that specifies an interaction on another surface 110. For example, a player control on a surface #1 110-1 may cause an action to be performed on a surface #2 110-2, such as causing a video to start playing. The action may also be implicit in that the interaction that is being performed on surface #1 110-1 causes an action to be performed on surface #2 110-2, such as a selection of a video on a browse area 306 causes details on another surface 110 to be obscured.

As discussed above, depending on the input mode, interactions may be interpreted to trigger a specific shift in planes. Whereas above, the inputs were described as being performed on surfaces 110 on a secondary plane, implicit gestures on a surface on the primary plane may also cause shifts in surfaces 110. For example, consider that an input is scrolling up and down through a browse surface 110. In the case of scrolling on a browse surface 110, this may be interpreted as a gesture intended to shift the surfaces. That is, when scrolling past the end of a scroll area, the distance scrolled past could be measured and used to perform a corresponding action, such as shifting the planes of surfaces 110.

At 704, application 114 determines if the interaction affects another surface 110. If not, then application 114 may not perform an action on another surface 110 and the process may revert to wait for more interactions to be received. If the interaction affects another surface 110, at 706, application 114 performs an action, such as on a surface #2 110-2. It is noted that application 114 may perform an action on surface #1 110-1 in addition to performing an action on surface #2.

Conclusion

Accordingly, a modeless interface is provided. That is, even if the different portions of surfaces 110 are displayed, application 110 does not change modes. Rather, each surface 110 may operate independently of another surface regardless of which information is being displayed on interface 112. The different portions of surfaces 110 can be displayed by manipulating the positioning of surfaces 110 on planes 202.

System

Figure 8:
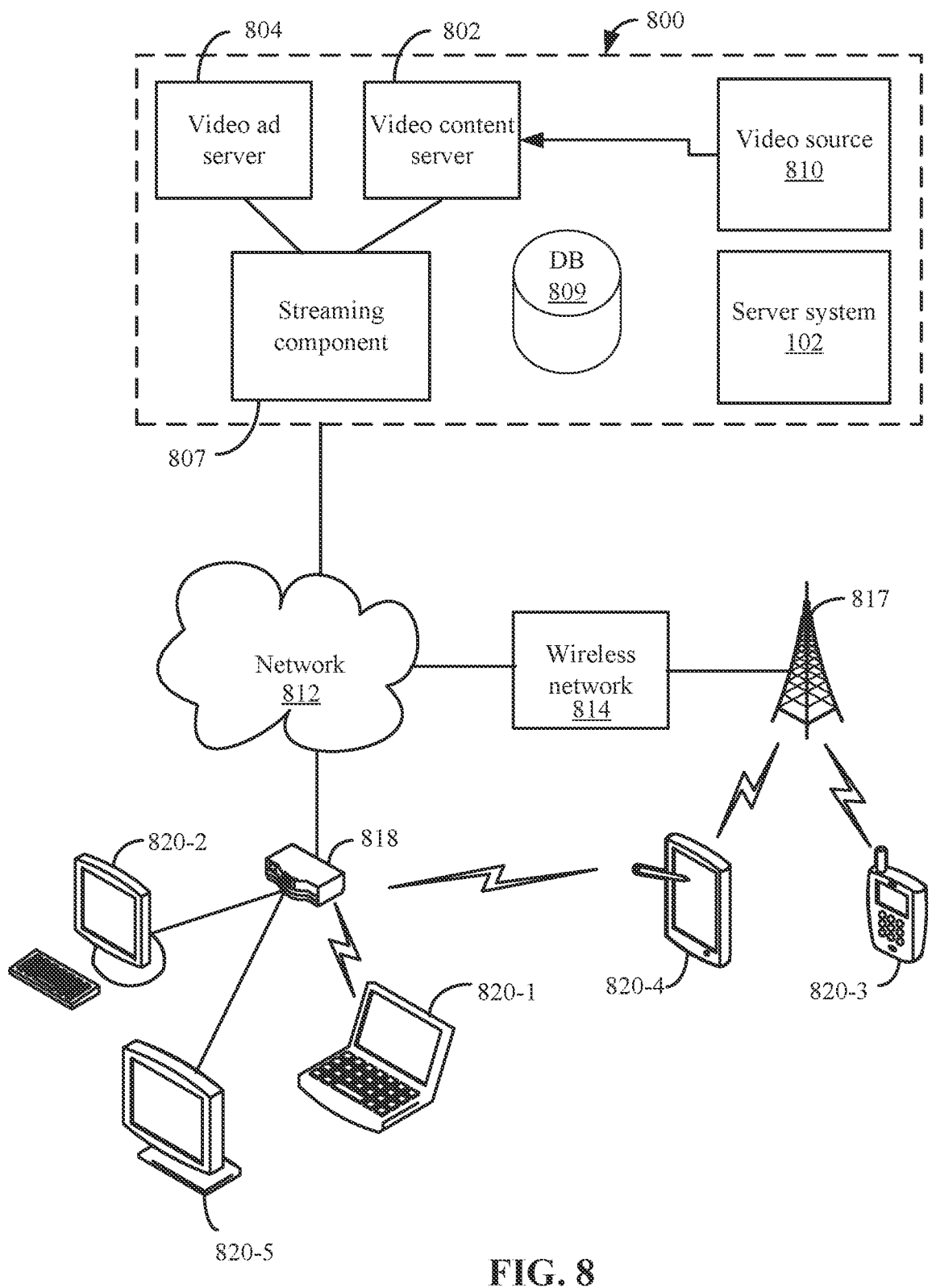
FIG. 8 depicts a video streaming system in communication with multiple client devices via one or more communication networks according to one embodiment.

Features and aspects as disclosed herein may be implemented in conjunction with a video streaming system 800 in communication with multiple client devices via one or more communication networks as shown in FIG. 8. Aspects of the video streaming system 800 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 800, video data may be obtained from one or more sources for example, from a video source 810, for use as input to a video content server 802. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 800 may include one or more computer servers or modules 802, 804, and/or 807 distributed over one or more computers. Each server 802, 804, 807 may include, or may be operatively coupled to, one or more data stores 809, for example databases, indexes, files, or other data structures. A video content server 802 may access a data store (not shown) of various video segments. The video content server 802 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 804 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 800, a public service message, or some other information. The video advertising server 804 may serve the video advertising segments as directed by a user interface controller (not shown).

The video streaming system 800 also may include server system 102.

The video streaming system 800 may further include an integration and streaming component 807 that integrates video content and video advertising into a streaming video segment. For example, streaming component 807 may be a content server or streaming media server. A controller (not shown) may determine the selection or configuration of advertising in the streaming video based on any suitable algorithm or process. The video streaming system 800 may include other modules or units not depicted in FIG. 8, for example, administrative servers, commerce servers, network infrastructure, advertising selection engines, and so forth.

The video streaming system 800 may connect to a data communication network 812. A data communication network 812 may comprise a local area network (LAN), a wide area network (WAN), for example, the Internet, a telephone network, a wireless cellular telecommunications network (WCS) 814, or some combination of these or similar networks.

One or more client devices 820 may be in communication with the video streaming system 800, via the data communication network 812, wireless cellular telecommunications network 814, and/or another network. Such client devices may include, for example, one or more laptop computers 820-1, desktop computers 820-2, "smart" mobile phones 820-3, tablet devices 820-4, network-enabled televisions 820-5, or combinations thereof, via a router 818 for a LAN, via a base station 817 for a wireless cellular telecommunications network 814, or via some other connection. In operation, such client devices 820 may send and receive data or instructions to the system 800, in response to user input received from user input devices or other input. In response, the system 800 may serve video segments and metadata from the data store 809 responsive to selection of media programs to the client devices 820. Client devices 820 may output the video content from the streaming video segment in a media player using a display screen, projector, or other video output device, and receive user input for interacting with the video content.

Distribution of audio-video data may be implemented from streaming component 807 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 807 may communicate with client device 820 using control messages and data messages to adjust to changing network conditions as the video is played. These control messages can include commands for enabling control functions such as fast forward, fast reverse, pausing, or seeking to a particular part of the file at the client.

Since streaming component 807 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 807 may use TCP-based protocols, such as HyperText Transfer Protocol (HTTP) and Real Time Messaging Protocol (RTMP). Streaming component 807 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are HTTP live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 9:
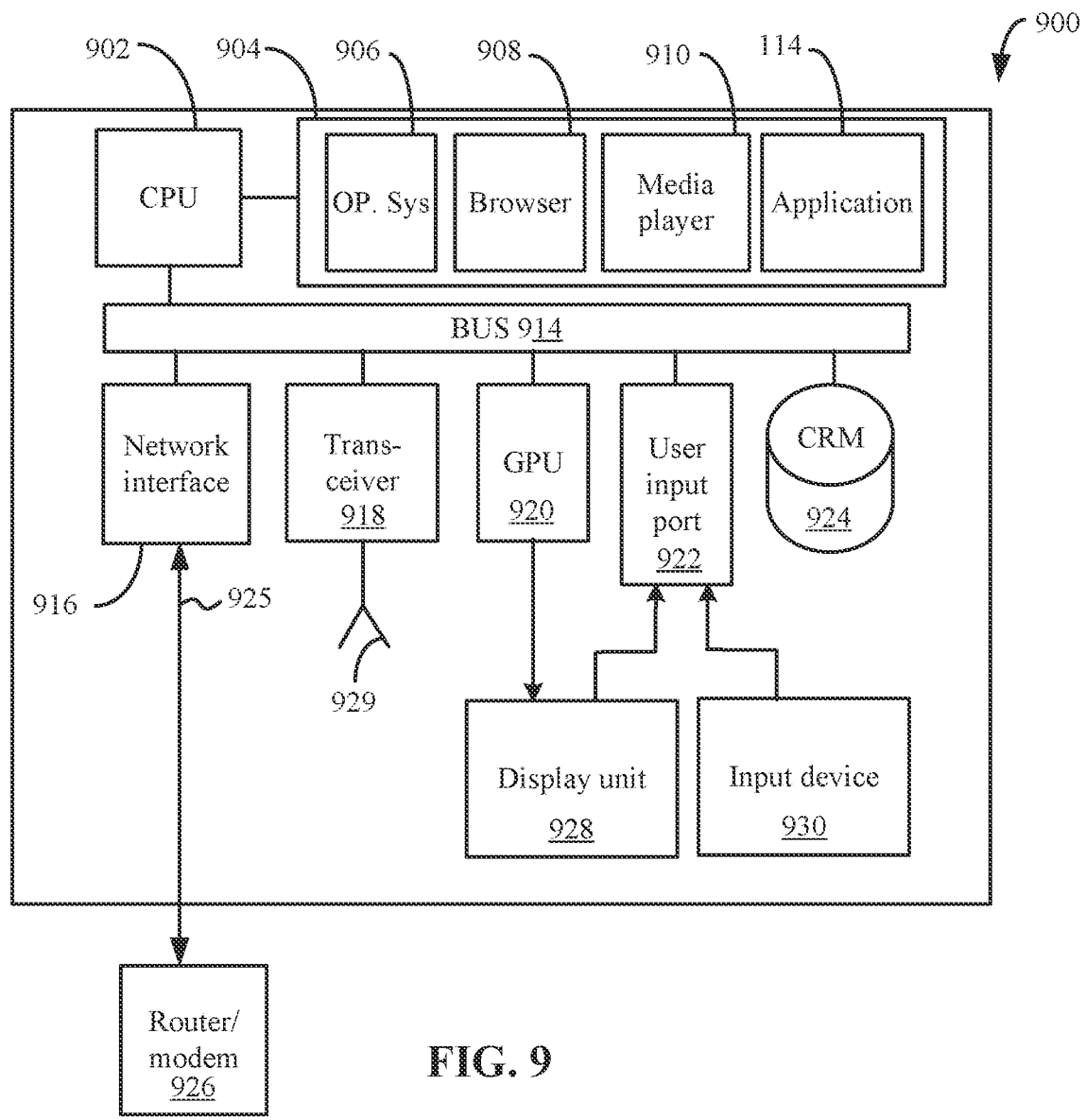
FIG. 9 depicts a diagrammatic view of an apparatus for viewing video content and advertisements.

Referring to FIG. 9, a diagrammatic view of an apparatus 900 for viewing video content and advertisements is illustrated. In selected embodiments, the apparatus 900 may include a processor (CPU) 902 operatively coupled to a processor memory 904, which holds binary-coded functional modules for execution by the processor 902. Such functional modules may include an operating system 906 for handling system functions such as input/output and memory access, a browser 908 to display web pages, and media player 910 for playing video. The modules may further include application 114. The memory 904 may hold additional modules not shown in FIG. 9, for example modules for performing other operations described elsewhere herein.

A bus 914 or other communication component may support communication of information within the apparatus 900. The processor 902 may be a specialized or dedicated microprocessor configured or operable to perform particular tasks in accordance with the features and aspects disclosed herein by executing machine-readable software code defining the particular tasks. Processor memory 904 (e.g., random access memory (RAM) or other dynamic storage device) may be connected to the bus 914 or directly to the processor 902, and store information and instructions to be executed by a processor 902. The memory 904 may also store temporary variables or other intermediate information during execution of such instructions.

A computer-readable medium in a storage device 924 may be connected to the bus 914 and store static information and instructions for the processor 902; for example, the storage device (CRM) 924 may store the modules 906, 908, 910 and 912 when the apparatus 900 is powered off, from which the modules may be loaded into the processor memory 904 when the apparatus 900 is powered up. The storage device 924 may include a non-transitory computer-readable storage medium holding information, instructions, or some combination thereof, for example instructions that when executed by the processor 902, cause the apparatus 900 to be configured or operable to perform one or more operations of a method as described herein.

A communication interface 916 may also be connected to the bus 914. The communication interface 916 may provide or support two-way data communication between the apparatus 900 and one or more external devices, e.g., the streaming system 800, optionally via a router/modem 926 and a wired or wireless connection. In the alternative, or in addition, the apparatus 900 may include a transceiver 918 connected to an antenna 929, through which the apparatus 900 may communicate wirelessly with a base station for a wireless communication system or with the router/modem 926. In the alternative, the apparatus 900 may communicate with a video streaming system 800 via a local area network, virtual private network, or other network. In another alternative, the apparatus 900 may be incorporated as a module or component of the system 800 and communicate with other components via the bus 914 or by some other modality.

The apparatus 900 may be connected (e.g., via the bus 914 and graphics processing unit 920) to a display unit 928. A display 928 may include any suitable configuration for displaying information to an operator of the apparatus 900. For example, a display 928 may include or utilize a liquid crystal display (LCD), touchscreen LCD (e.g., capacitive display), light emitting diode (LED) display, projector, or other display device to present information to a user of the apparatus 900 in a visual display.

One or more input devices 930 (e.g., an alphanumeric keyboard, microphone, keypad, remote controller, game controller, camera, or camera array) may be connected to the bus 914 via a user input port 922 to communicate information and commands to the apparatus 900. In selected embodiments, an input device 930 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 928, for example using a touch sensitive screen. A cursor control device may communicate direction information and command selections to the processor 902 and control cursor movement on the display 928. A cursor control device may have two or more degrees of freedom, for example allowing the device to specify cursor positions in a plane or three-dimensional space.

Example Embodiments

In some embodiments, a method comprising: applying, by a computing device, a priority to a plurality of surfaces, wherein the plurality of surfaces each include content; displaying, by the computing device, content from a first portion of a first surface in the interface based on a priority that is applied to the first surface, wherein a second portion of a second surface is obscured by the first surface; maintaining, by the computing device, operation of the second portion of the second surface; receiving, by the computing device, an interaction from the interface; and adjusting, by the computing device, the display of the interface, wherein the adjusting displays the second portion of the second surface in the interface in a state based on the maintaining of the operation.

In some embodiments, the plurality of surfaces are applied assigned to a plurality of planes in a space.

In some embodiments, the plurality of planes are assigned different priorities, and surfaces applied to the plurality of planes are assigned the respective priority of the respective plane.

In some embodiments, the space comprises a three dimensional space.

In some embodiments, the priorities for the planes are based on positioning of the planes in the three dimensional space.

In some embodiments, displaying content from the first portion of the first surface comprises: analyzing respective priorities of the plurality of surfaces to select which content to display in the interface.

In some embodiments, the first portion of the first surface has a higher priority than the second portion of the second surface.

In some embodiments, the method further comprising: displaying content from a third portion of the second surface that is not obscured by the first portion of the first surface.

In some embodiments, adjusting the display of the interface comprises: performing an action on the first surface or on the second portion of the second surface.

In some embodiments, the first portion comprises a media player that is playing a video; and the second portion comprises the second portion comprises information about a video.

In some embodiments, adjusting the display of the interface comprises: moving the first surface to reveal the second portion of the second surface.

In some embodiments, adjusting the display of the interface comprises: displaying content from the second surface, wherein the content from the second surface obscures at least a portion of the first surface; and maintaining operation of the first surface.

In some embodiments, adjusting the display of the interface comprises: changing the priority of the first surface to another priority to display the second portion of the second surface.

In some embodiments, a non-transitory computer-readable storage medium containing instructions, that when executed, control a computer system to be operable for: applying a priority to a plurality of surfaces, wherein the plurality of surfaces each include content; displaying content from a first portion of a first surface in the interface based on a priority that is applied to the first surface, wherein a second portion of a second surface is obscured by the first surface; maintaining operation of the second portion of the second surface; receiving an interaction from the interface; and adjusting the display of the interface, wherein the adjusting displays the second portion of the second surface in the interface in a state based on the maintaining of the operation.

In some embodiments, a method comprising: applying, by a computing device, a priority to a plurality of surfaces, wherein the plurality of surfaces each include content; displaying, by the computing device, portions from multiple surfaces of the plurality of surfaces in an interface based on respective priorities of the plurality of surfaces; continuing, by the computing device, operation of portions of surfaces in the plurality of surfaces that include a portion that are is not displayed in the interface; and processing, by the computing device, an interaction to change the display of content in the interface to reveal a portion of a surface that was not displayed in the interface in a current state of operation, wherein the change is determined based on respective priorities for the plurality of surfaces.

In some embodiments, a first portion from a first surface obscures a second portion from a second surface.

In some embodiments, the plurality of surfaces are assigned to a plurality of planes, wherein the plurality of planes are associated with the respective priorities.

In some embodiments, displaying portions from the multiple surfaces comprises: analyzing respective priorities of the plurality of surfaces to select which content to display in the interface.

In some embodiments, processing an interaction to change the display of content comprises: changing a priority associated with a surface to change the content that is displayed from the surface.

In some embodiments, processing an interaction to change the display of content comprises: moving a surface to change the content that is displayed in the interface.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
applying, by a computing device, a priority to a plurality of surfaces, wherein the plurality of surfaces each include content;
displaying, by the computing device, content from a first portion of a first surface in an interface based on a first priority that is assigned to the first surface, wherein a second portion of a second surface is obscured by the first surface;
maintaining, by the computing device, operation of the second portion of the second surface;

receiving, by the computing device, an interaction from the interface;

when the interaction meets a first threshold of movement to indicate not changing a change in plane position and then priority, moving, by the computing device, the first surface based on the interaction without changing plane position and then priority of the first surface and the second surface;

when the interaction meets a second threshold of movement, greater than the first threshold of movement, to indicate the change in plane position and then priority, performing:

adjusting, by the computing device, the first priority that is assigned to the first surface to a second priority, wherein the second surface is assigned the first priority;

moving, by the computing device, the first surface based on the interaction; and adjusting, by the computing device, plane positions associated with the first surface and the second surface based on the second priority being assigned to the first surface and the first priority being assigned to the second surface, wherein the second portion of the second surface is displayed in the interface in a state based on the maintaining of the operation.

2. The method of claim 1, wherein a respective surface in the plurality of surfaces is assigned to a respective plane in a plurality of planes in a space.

3. The method of claim 2, wherein:
a first plane and a second plane in the plurality of planes are assigned different priorities, and
the first surface and the second surface are assigned a respective priority of the first plane and the second plane.

4. The method of claim 2, wherein the space comprises a three dimensional space.

5. The method of claim 4, wherein the priorities for planes in the plurality of planes are based on positioning of the planes in the three dimensional space.

6. The method of claim 1, wherein displaying content from the first portion of the first surface comprises:
analyzing respective priorities of the plurality of surfaces to select which content to display in the interface.

7. The method of claim 6, wherein the first portion of the first surface has a higher priority than the second portion of the second surface.

8. The method of claim 1, further comprising:
displaying content from a third portion of the second surface that is not obscured by the first portion of the first surface.

9. The method of claim 1, wherein adjusting the plane positions comprises:
performing an action on the first surface or on the second portion of the second surface.

10. The method of claim 1, wherein:
the first portion comprises a media player that is playing a video; and
the second portion comprises information about a video.

11. The method of claim 1, wherein adjusting the plane positions comprises:
moving the first surface to reveal the second portion of the second surface.

12. The method of claim 1, wherein adjusting the plane positions comprises:

displaying content from the second surface, wherein the content from the second surface obscures at least a portion of the first surface; and
maintaining operation of the first surface.

13. The method of claim 1, wherein the second priority of the first surface is another priority in a plurality of priorities that displays the second portion of the second surface.

14. The method of claim 1, wherein:
the interaction moves the first surface while providing feedback on shifting plane positions of the first surface before meeting the first threshold; and
the shifting of plane positions is not performed when the interaction stops before the first threshold is met.

15. The method of claim 1, wherein:
when the interaction does not meet the first threshold to not indicate the change in plane position, canceling a movement of the first surface due to the interaction.

16. A non-transitory computer-readable storage medium containing instructions, that when executed, control a computer system to be operable for:

applying a priority to a plurality of surfaces, wherein the plurality of surfaces each include content;

displaying content from a first portion of a first surface in an interface based on a first priority that is assigned to the first surface, wherein a second portion of a second surface is obscured by the first surface;

maintaining operation of the second portion of the second surface;

receiving an interaction from the interface;

when the interaction meets a first threshold of movement to indicate not changing a change in plane position and then priority, moving, by the computing device, the first surface based on the interaction without changing plane position and then priority of the first surface and the second surface;

when the interaction meets a second threshold of movement, greater than the first threshold of movement, to indicate the change in plane position and then priority, performing:

adjusting the first priority that is assigned to the first surface to a second priority, wherein the second surface is assigned the first priority;

moving the first surface based on the interaction; and adjusting plane positions associated with the first surface and the second surface based on the second priority being assigned to the first surface and the first priority being assigned to the second surface, wherein the second portion of the second surface is displayed in the interface in a state based on the maintaining of the operation.

17. A method comprising:
applying, by a computing device, a priority to a plurality of surfaces, wherein the plurality of surfaces each include content;

displaying, by the computing device, portions from multiple surfaces of the plurality of surfaces in an interface based on respective priorities of the plurality of surfaces;

continuing, by the computing device, operation of surfaces in the plurality of surfaces that include a portion that is not displayed in the interface;

processing, by the computing device, an interaction;

when the interaction meets a first threshold of movement to indicate not changing a change in plane position and then priority, moving, by the computing device, a first surface based on the interaction without changing plane position and then priority of the first surface and the plurality of surfaces that include a portion that is not displayed in the interface;

when the interaction meets a second threshold of movement, greater than the first threshold of movement, to indicate the change in plane position and then priority, performing:

adjusting, by the computing device, a first priority of the first surface to a second priority, wherein a second surface of the plurality of surfaces that include a portion that is not displayed in the interface is assigned the first priority;

moving, by the computing device, the first surface based on the interaction; and adjusting, by the computing device, plane positions associated with the first surface and the second surface based on the second priority being assigned to the first surface and the first priority being assigned to the second surface, wherein a portion of the second surface that was not displayed in the interface is revealed in a current state of operation based on the continuing operations of surfaces in the plurality of surfaces that include a portion that is not displayed in the interface.

18. The method of claim 17, wherein a first portion from the first surface obscures a second portion from the second surface.

19. The method of claim 17, wherein a respective surface in the plurality of surfaces is assigned to a respective plane in a plurality of planes, wherein the respective plane is associated with a respective priority associated with the respective surface.

20. The method of claim 17, wherein displaying portions from the multiple surfaces comprises:

analyzing respective priorities of the plurality of surfaces to select which content to display in the interface.

21. The method of claim 17, wherein:

the interaction moves the first surface while providing feedback on shifting plane positions of the first surface before meeting the first threshold; and the shifting of plane positions is not performed when the interaction stops before the first threshold is met.

22. The method of claim 17, wherein:

when the interaction does not meet the first threshold to not indicate the change in plane position, canceling a movement of the first surface due to the interaction.

\* \* \* \* \*